UNITED STATES PATENT OFFICE.

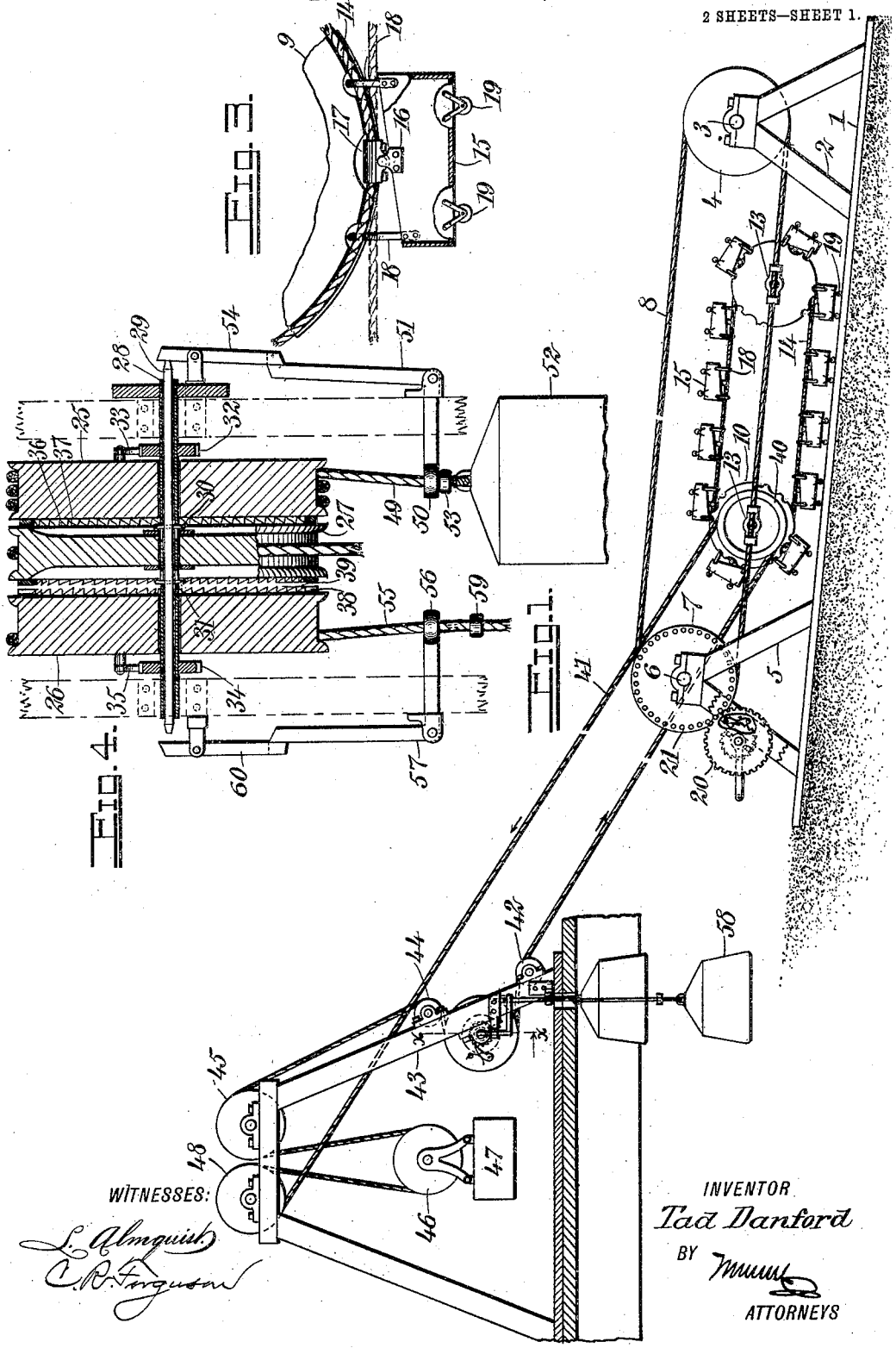

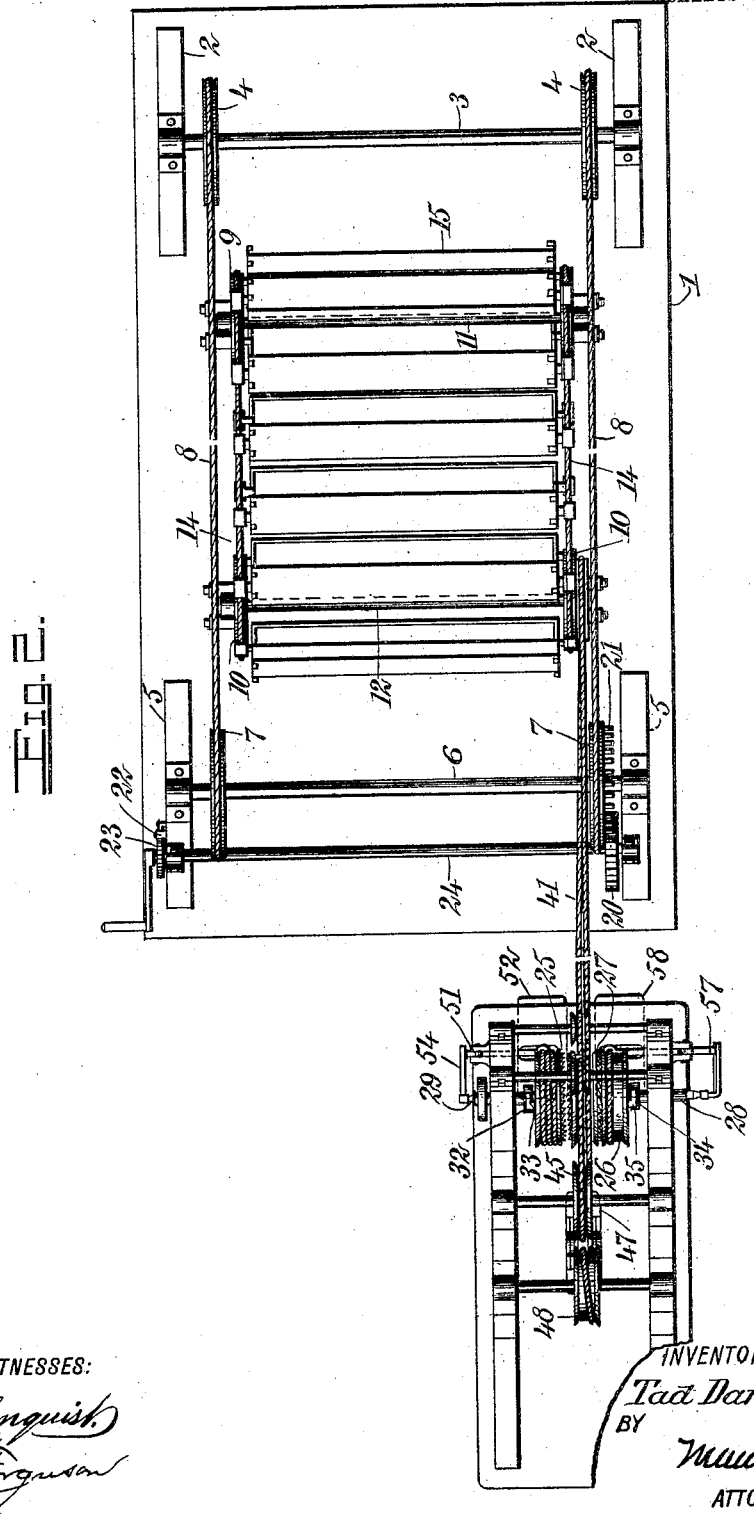

TAD DANFORD, OF BOULDER, COLORADO.

SURF-ACTUATED MOTOR.

No. 820,286.             Specification of Letters Patent.             Patented May 8, 1906.

Application filed May 13, 1905. Serial No. 260,242.

*To all whom it may concern:*

Be it known that I, TAD DANFORD, a citizen of the United States, and a resident of Boulder, in the county of Boulder and State of Colorado, have invented a new and Improved Surf-Actuated Motor, of which the following is a full, clear, and exact description.

This invention relates to improvements in motors designed to be placed upon the beach of a body of water in which there is a surf or swell adapting it to be operated by the receding water, the object being to provide a motor of this character that will be simple in construction, having no parts liable to get out of order, that will give practically an even motion to a machine to be driven, and that may be placed on a beach of any incline.

I will describe a surf-actuated motor embodying my invention and then point out the novel features in the appended claims.

Reference is to be had to the accompanying drawings, forming a part of this specification, in which similar characters of reference indicate corresponding parts in all the figures.

Figure 1 is a side elevation of a surf-actuated motor embodying my invention. Fig. 2 is a plan thereof. Fig. 3 is a sectional detail showing one of the buckets employed; and Fig. 4 is a section on the line $x\ x$ of Fig. 1 looking in the direction of the arrow, showing the transmission-gearing employed.

Referring to the drawings, 1 designates a track or platform designed to be placed upon a beach with the lower end sufficiently in the water to permit the action of the water on the buckets, to be hereinafter described. Supported on standards 2 at the lower end of the platform or track is a shaft 3, to which sheaves 4 are rigidly attached, and at the upper end are standards 5, on which a shaft 6 has its bearings, and on this shaft are secured sheaves 7. Extending around the upper and lower opposite sheaves are endless cables 8, and on the lower stretches of the cables lower sheaves 9 and upper sheaves 10 are supported. The sheaves 9 are mounted on a shaft 11, and the upper sheaves are mounted on a shaft 12. The sheaves have bearings in boxes 13, secured to the cables 8. Extending around the sheaves are cables 14, as clearly indicated in Fig. 1. Secured to the cables 14 at suitable distances apart are boxes 15, which are open at the top. These boxes, as shown in Fig. 3, are provided with hangers 16, pivotally connected to clips 17, secured to the cables 14, and to keep the said boxes on a practically horizontal line they are provided on the ends with loops 18, which engage loosely around the cables. On the lower sides of the boxes are rollers 19, designed to engage with the platform or track 1 to support the boxes when moving downward filled with water. These boxes are designed to be placed at a suitable distance in the water to receive the same as the surf or waves come in, and this distance may be regulated by adjusting the cables 8. This adjustment may be made by means of a gear-wheel 20, engaging with teeth 21 on one of the sheaves 7 and held as adjusted by a pawl 22, engaging with a ratchet-wheel 23 on the shaft 24 of the gear-wheel 20.

The movement of the buckets downward is designed to operate the transmission-gearing for machinery. This transmission-gearing may be placed at any suitable point on the shore or in a building. The said transmission-gearing comprises actuating-drums 25 26 and a clutch-drum 27. These several drums are loosely mounted on tubular shafts 28, extended through which is a rod 29, the said rod being movable lengthwise in the tubular shaft, and extended outward from the rod through slots formed in the tubular shaft at opposite sides of the drum 27 are pins 30 31, designed to engage with opposite sides of said drum 27.

Rigidly attached to the tubular shaft 28 at the outer side of the drum 25 is a ratchet-wheel 32, engaged by a spring-pressed pawl 33, carried by said drum 25, and a similar ratchet-wheel 34 is rigidly attached to the tubular shaft at the outer side of the drum 26 and attached by a spring-pressed pawl 35, carried on said drum 26. The inner side of the drum 25 is provided with ratchet or clutch teeth 36, designed to be engaged by clutch-teeth 37 on the clutch-drum 27, while the inner side of the drum 26 is provided with ratchet-teeth 38 to be engaged by ratchet-teeth 39 on said clutch-drum 27.

From a pulley 40, attached to one of the sheaves 10, a cable 41 extends upward over an idler 42, mounted in a frame 43, thence around the clutch-drum 27, under an idler 44, from which the cable passes upward over a pulley 45, thence around a pulley 46, on which a weight 47 is suspended, and thence around a pulley 48. The weight 47 is designed to take up any slack, or rather to prevent any slack of the endless cable 41 when the bucket or boxes are adjusted downward or upward.

Engaging with the winding-drum 25 is a cable 49, which passes through an eye 50 on the horizontally-disposed member of an angle-lever 51, and attached to the lower end of the cable 49 is a weight 52, above which a block 53 is secured to the cable. The upwardly-disposed member of the angle-lever 51 is designed to engage with a lever 54, arranged to press against one end of the rod 29. Attached to the drum 26 is a cable 55, passing through an eye 56 of an angle-lever 57, and attached to this cable 55 is a weight 58, above which and on the cable is a block 59. The angle-lever 57 is designed to engage with a lever 60, which operates to move the rod 29 in one direction.

In the operation a series of buckets may be arranged at any desired point in the surf upon operating the cables 8. As the water comes in it will fill the lower series of buckets and the weight of the water as the surf recedes will move the buckets downward. When the parts are in the position indicated in Fig. 4, the downward movement of the buckets will cause a winding motion of the cylinder 25, and the other cylinder 26 will cause a rotary movement of the shaft 28. When the collar 53 engages with the angle-lever 51, the said angle-lever will be tilted and cause the lever 54 to move the clutch-wheel 27 into engagement with the drum or cylinder 26, thus leaving the drum 25 free to operate the shaft 28 while the cable 55 is being wound on said drum 26.

From this construction it will be seen that the motor is practically automatic in its operations. As the buckets move along the upper stretches of the cables 14 the water will be discharged therefrom.

Having thus described my invention, I claim as new and desire to secure by Letters Patent—

1. A surf-actuated motor comprising a plurality of buckets, endless cables to which the buckets are secured, endless adjusting-cables carrying the buckets by means of which the buckets may be moved inward and outward with relation to the shore line, and transmission-gearing operated by movements of the buckets.

2. A surf-actuated motor comprising two endless cables, sheaves around which the cables pass, sheaves mounted on the lower stretches of said cables, bucket-carrying cables extending around said last-named sheaves, buckets on said cables, a pair of winding-drums, cables extending around said drums, weights on the cables, a clutch-wheel adapted for engagement with either one of said drums, and a driving-cable connection between one of said last-named sheaves and said clutch drum or wheel.

3. A surf-actuated motor comprising sheaves, cables extending around said sheaves, other sheaves supported on the lower stretches of said cables, cables extending around said other sheaves, buckets mounted on said cables, means for adjusting the first-named cables, a pair of winding-drums, cables extending around the winding-drums, weights on said cables, clutch-teeth on the inner sides of said drum, a clutch-drum having teeth for engaging with the teeth of either one of the said drums, a shaft on which the several drums are loosely mounted, rigid connections between said shaft and the winding-drums, means for automatically shifting the clutch-drum into engagement alternately with the winding-drums, and a cable having connection with the clutch-drum and operated by means of the buckets.

4. A surf-actuated motor comprising a pair of endless cables, sheaves supported on the lower stretches of said endless cables, bucket-carrying cables extending around said last-named sheaves, buckets on said cables, swinging connections between the buckets and cables, and a transmission-gearing actuated by movements of the buckets.

5. A surf-actuated motor comprising a plurality of buckets, endless cables on which the buckets are mounted, each bucket being of box-like construction, rollers carried by the buckets, a track on which said rollers are adapted to engage, means for adjusting the buckets as to their position in the water, and a transmission-gearing actuated by movements of the buckets.

6. In a surf-actuated motor, a tubular shaft, winding-drums loosely mounted on said shaft, weighted cables having connection with the drums, a clutch-drum loosely mounted on the tubular shaft and adapted for engagement with either one of the winding-drums, means actuated by water-pressure for causing movements of the clutch-drum, a rod mounted to move lengthwise through the hollow shaft, lever mechanism causing longitudinal movements of said rod, ratchet-wheels secured to the hollow shaft, and pawls carried by the winding-drums for engaging with said ratchet-wheels.

In testimony whereof I have signed my name to this specification in the presence of two subscribing witnesses.

TAD DANFORD.

Witnesses:
 E. W. VAN FLEET,
 N. J. BLISS.